United States Patent
Takasaki et al.

(10) Patent No.: US 6,843,160 B2
(45) Date of Patent: Jan. 18, 2005

(54) NEGATIVE PRESSURE BRAKE BOOSTER

(75) Inventors: Yoshiyasu Takasaki, Saitama-Ken (JP); Hidefumi Inoue, Saitama-Ken (JP); Yasushi Mori, Saitama-Ken (JP); Hiroyuki Oka, Saitama-Ken (JP)

(73) Assignee: Bosch Automotive Systems Corporation, Tokyo (JP)

( * ) Notice: Subject to any disclaimer, the term of this patent is extended or adjusted under 35 U.S.C. 154(b) by 25 days.

(21) Appl. No.: 10/279,504

(22) Filed: Oct. 24, 2002

(65) Prior Publication Data
US 2003/0121406 A1 Jul. 3, 2003

(30) Foreign Application Priority Data
Dec. 27, 2001 (JP) ........................................ 2001/396761

(51) Int. Cl.[7] ................................................. F15B 9/10
(52) U.S. Cl. .................... 91/369.1; 91/376 R
(58) Field of Search ............................ 91/376 R, 369.1, 91/369.2, 369.3

(56) References Cited

U.S. PATENT DOCUMENTS 5,479,844 A * 1/1996 Heibel et al. .............. 91/369.3
6,408,738 B1 * 6/2002 Harth et al. ................ 91/369.3
6,564,692 B2 * 5/2003 Inoue et al. ................ 91/369.3

FOREIGN PATENT DOCUMENTS

JP 5-193486 8/1993

* cited by examiner

*Primary Examiner*—Edward K. Look
*Assistant Examiner*—Igor Kershteyn
(74) *Attorney, Agent, or Firm*—Flynn, Thiel, Boutell & Tanis, P.C.

(57) ABSTRACT

A tubular member 18 is slidably fitted into a valve body, and is formed with a vacuum valve seat 21. The tubular member 18, a valve plunger 16 and the valve body 3 are maintained in their inoperative positions shown by abutment against a key member 13. A holder 14 is formed with a tapered surface 14a to assist in allowing an elastic deformation of a reaction disc 15. Immediately after the commencement of operation of a valve mechanism 7 as an input shaft 8 is driven forward, the input shaft 8 and the tubular member 18 are maintained in their inoperative positions until a rear end face of a variable pressure passage 28 abuts against the key member 13. The operating stroke of an input shaft 6 can be chosen to be less than the operating stroke of an output shaft 11 while preventing the jumping value from increasing to an excessively high value.

9 Claims, 2 Drawing Sheets

NEGATIVE PRESSURE BRAKE BOOSTER

FIELD OF THE INVENTION

The invention relates to a negative pressure brake booster, and more particularly, to a negative pressure brake booster in which an operating stroke, namely, a stroke through which an input shaft is operated is chosen to be less than the operating stroke of an output shaft.

DESCRIPTION OF THE PRIOR ART

A negative pressure brake booster is known in the art in which the operating stroke of an input shaft is chosen to be less than the operating stroke of an output shaft (See, for example, Japanese Laid-Open Patent Application No. 193,486/1993).

In a brake booster disclosed in FIG. 1 of the cited Application, a sleeve 13 is slidably fitted into the inner periphery of a valve body and has a rear end on which a vacuum valve seat 10 is formed. The sleeve 13 is normally urged rearward by a spring 14 to cause the front end of a notch formed in the sleeve 13 to abut against a key member 17, which in turn abuts against the wall of a shell, whereby the sleeve 13 and the key member 17 are maintained in their inoperative positions.

When an input shaft 4 is driven forward under the inoperative condition, a valve element 12 becomes seated upon the vacuum valve seat 10 while it is removed from an atmosphere valve seat 11, allowing the atmosphere to be introduced into a variable pressure chamber 7 to drive the valve body 8 forward to deliver an output. During an initial phase of commencing the operation of the booster, the sleeve 13 (vacuum valve seat 10), the valve element 12, the key member 17 and the input shaft 4 are maintained in their inoperative positions by the spring 14 until a stop 18 which is driven forward together with the valve body 8 abuts against the key member 17 on the sleeve 13.

In the booster disclosed in the cited Application, the operating stroke of the input shaft 4 is chosen to be less than the operating stroke of an output shaft 20 in this manner, thus reducing the lost motion of the input shaft 4 which is caused by the play of the piston of a master cylinder in the axial direction.

In the booster disclosed in the cited Application, an arrangement is made so that a brake reaction which acts upon the output shaft 20 is transmitted to the input shaft 4 through pistons 23 and 15 which are rigid bodies. In other words, the booster disclosed in the cited Application does not premise the use of a reaction disc formed by a resilient body to serve as a reaction-transmitting member which is well known in the art.

A need has been recognized in the art to apply the technical concept of the cited Application to a brake booster including a reaction disc formed by a resilient body and acting as a reaction-transmitting member.

However, when the technical concept of the cited Application is applied to a negative pressure brake booster which includes a reaction disc, there arises a difficulty as follows: specifically, during the initial phase of commencement of operation of a brake booster as the input shaft is driven forward, the sleeve (the vacuum valve seat), the valve element, a valve plunger and the input shaft are maintained in their inoperative positions, while the valve body and the output shaft are driven forward. Accordingly, a clearance between the reaction disc and the opposing end face of the valve plunger increases temporarily. When the clearance between both members increases, there results a difficulty that a jumping value becomes excessively high when a brake reaction which acts upon the output shaft subsequently causes the reaction disc to bulge into abutment against the valve plunger.

SUMMARY OF THE INVENTION

Accordingly, it is an object of the present invention to provide a negative pressure brake booster which allows the operating stroke of the input shaft to be chosen to be less than the operating stroke of the output shaft while preventing the jumping value from increasing to an excessively high value.

Thus, the present invention relates to a negative pressure brake booster including a valve body slidably disposed within a shell, a power piston mounted on the valve body, a constant pressure chamber and a variable pressure chamber defined across the power piston within the shell, a valve mechanism operated by an input shaft to switch a communication between the constant pressure chamber, the variable pressure chamber and the atmosphere, the valve mechanism including a vacuum valve seat disposed within the valve body, a valve plunger slidably fitted into the valve body and connected to the input shaft, an atmosphere valve seat formed on the valve plunger, and a valve element adapted to move into engagement with or disengagement from the vacuum valve seat and the atmosphere valve seat, and also including a reaction disc disposed between the output shaft and the front end face of the valve body for transmitting a brake reaction which acts upon the output shaft when the valve mechanism is operated by the input shaft through the valve plunger.

In accordance with the present invention, the negative pressure brake booster further comprises a tubular member slidably fitted into the inner periphery of the valve body, the vacuum valve seat being formed on the tubular member, urging means for normally urging the tubular member rearward, and holding means for retaining the tubular member in its inoperative position until the valve body and the output shaft are driven forward through a given stroke, thereby providing a space between the rear side of the reaction disc and the valve body which assists in allowing an elastic deformation of the reaction disc toward the valve plunger at the commencement of operation of the valve mechanism.

The described arrangement according to the present invention allows the operating stroke of the input shaft to be chosen to be less than the operating stroke of the output shaft. If the clearance between the reaction disc and the end face of the valve plunger increases temporarily, the provision of the space assists in allowing an elastic deformation of the reaction disc subsequently for abutment against the valve plunger. This prevents the jumping value from increasing to an excessively high value.

Above and other objects, features and advantages of the present invention will become apparent from the following detailed description of several embodiments thereof with reference to the drawings.

DETAILED DESCRIPTION OF THE EMBODIMENTS

Figure 1:
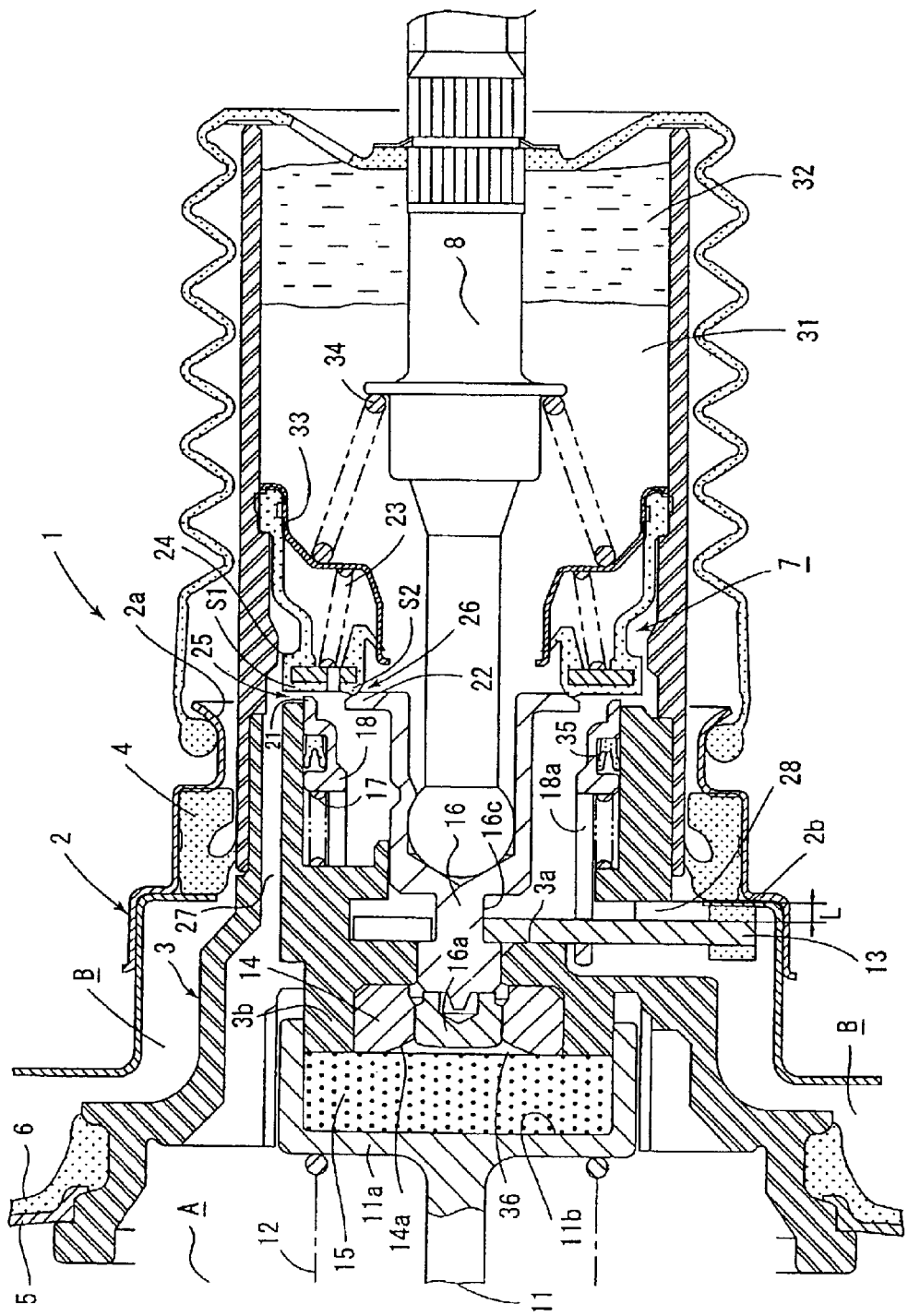
FIG. 1 is a cross-section of a first embodiment of the present invention.

Several embodiments of the present invention will now be described. Referring to FIG. 1, a negative pressure brake booster 1 includes a shell 2 in which a substantially tubular valve body 3 is slidably disposed. The rear end of the valve body 3 projects externally through a rear opening 2a of the shell 2, in which an annular seal member 4 is disposed to maintain a hermetic seal between the outer periphery of the rear end of the valve body 3 and the opening 2a in the shell 2.

A dish-shaped power piston 5 is connected around the outer periphery of the valve body 3, and a diaphragm 6 is applied to the back surface of the power piston 5, thereby partitioning the interior of the shell 2 into a forwardly located, constant pressure chamber A and a rearwardly located, variable pressure chamber B. A tubing, not shown, is connected to the front wall of the shell 2 for normally introducing a negative pressure into the constant pressure chamber A.

A valve mechanism 7, which will be described in detail later, is disposed within the valve body 3, and is arranged to be operated upon by an input shaft 8 which is connected to a brake pedal, not shown. When the input shaft 8 is driven forward to operate the valve mechanism 7, the communication between the constant pressure chamber A and the variable pressure chamber B is interrupted while the atmosphere is introduced into the variable pressure chamber B, thus allowing the valve body 3 and an output shaft 11 to be driven forward to deliver an output at a given servo ratio.

A return spring 12 is disposed within the constant pressure chamber A between the front wall of the shell 2, not shown, and a base 11a of the output shaft 11, thus normally urging the valve body 3 rearward. In the inoperative condition of the negative pressure brake booster 1 shown in FIG. 1, a key member 13 abuts against a rear wall 2b of the shell 2 and remains at rest, and a rearwardly facing stepped end face 3a of the valve body 3 abuts against the key member 13 which remains at rest, whereby the valve body 3 and the output shaft 11 are maintained in their inoperative positions shown.

Toward the front end, the inner periphery of the valve body 3 is formed with a forwardly extending annular projection 3b, within which an annular holder 14 is fitted while maintaining a hermetic seal. The holder 14 has an axial size which is the same as the axial size of the annular projection 3b, and accordingly, the end face of the annular projection 3b and the front end face of the holder 14 lie on a common plane. The holder 14 is formed of a rigid body, and substantially forms part of the valve body 3. It is to be noted that the holder 14 may be formed integrally with the valve body 3.

The output shaft 11 has a front end which is engaged with the piston of a master cylinder, not shown, which extends through an opening formed in the front wall of the shell 2.

The base 11a of the output shaft 11 is formed with a rearwardly facing recess 11b, in which a reaction disc 15 is contained. The annular projection 3b is slidably fitted into the inner periphery of the recess 11b toward the rear end thereof.

In this manner, the reaction disc 15 is held sandwiched between the bottom of the recess 11b of the output shaft 11 and the end face of the annular projection 3b and the front end face of the holder 14. The reaction disc 15 is substantially disc-shaped and is formed of rubber in the similar manner as known in the art.

A plate plunger 16a, which forms a front portion of a valve plunger 16, is slidably fitted into the inner periphery of the holder 14, and thus the front end face of the plate plunger (or the front end face of the valve plunger 16) is disposed in opposing relationship with the reaction disc 15. In the inoperative condition shown, a slight clearance is maintained between the reaction disc 15 and the plate plunger 16a.

When the input shaft 8 and its connected valve plunger 16 are driven forward to operate the valve mechanism 7, the valve body 3 and the output shaft 11 are driven forward, and the output shaft 11 causes the piston of a master cylinder, not shown, to be driven forward to develop a braking liquid pressure. When a brake reaction acts upon the output shaft 11, an axial portion of the reaction disc 15 bulges rearward to abut against the plate plunger 16a. From this time on, the brake reaction is transmitted to a brake pedal, not shown, through the valve plunger 16 and the input shaft 8.

Figure 2:
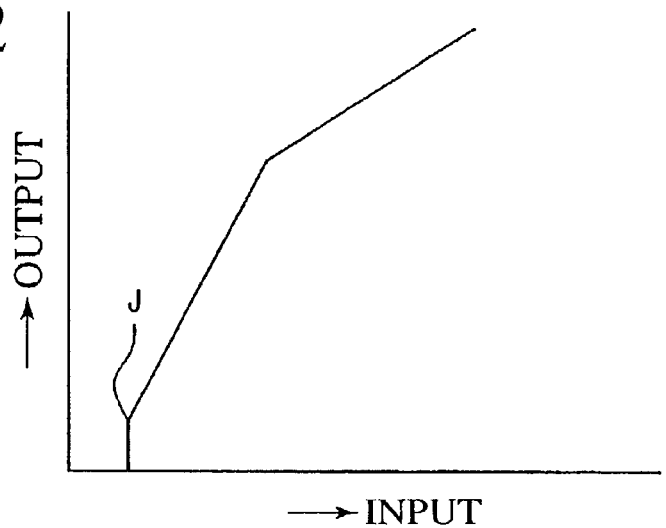
FIG. 2 graphically shows a characteristic diagram of the negative pressure brake booster 1 shown in FIG. 1.

In the graphical illustration shown in FIG. 2, a point J where the reaction disc 15 abuts against the plate plunger 16a is commonly referred to as a jumping point because an output increases instantaneously with respect to the input.

The valve mechanism 7 which switches the communication between the constant pressure chamber A, the variable pressure chamber B and the atmosphere will now be described. In the present embodiment, the valve mechanism 7 comprises a tubular member 18 which is slidably fitted into the inner periphery of the valve body 3 and which is urged rearward by a spring 17, a vacuum valve seat 21 formed on the rear end of the tubular member 18, the valve plunger 16 which extends through the tubular member 18 from the rear side to be slidably fitted into the inner periphery of the valve body 3, an annular atmosphere valve seat 22 formed on the rear end face of the valve plunger 16, and a valve element 24 which is adapted to be seated upon the vacuum valve seat 21 and the atmosphere valve seat 22 from the rear side under the resilience of a spring 23.

A combination of an outer or first seat S1 on the valve element 24 and the vacuum valve seat 21 which is disposed for engagement with or disengagement from the first seat S1 constitutes a vacuum valve 25, and a combination of an inner or second seat S2 of the valve element 24 and the atmosphere valve seat 22 which is disposed for engagement with or disengagement from the second seat S2 constitutes an atmosphere valve 26.

A space located radially outward of the vacuum valve 25 communicates with the constant pressure chamber A through a constant pressure passage 27 formed in the valve body 3. A space located between the vacuum valve 25 and the atmosphere valve 26 communicates with the variable pressure chamber B through a variable pressure passage 28 which is a radial opening formed in the valve body 3. A space located radially inward of the atmosphere valve 26 communicates with the atmosphere through an atmosphere passage 31 defined within the valve body 3 and a filter 32 disposed therein.

A rear axial portion of the valve plunger 16 is pivotally connected with the distal end of the input shaft 8, and a spring 34 having a greater resilience than the spring 23 is disposed between a retainer 33 which is fitted inside the valve body 3 and the outer periphery of the input shaft 8. The other end of the input shaft 8 is connected to a brake pedal, not shown.

The key member 13 is passed into the variable pressure passage 28 formed in the valve body 3 and through a notch 18a formed in the tubular member 18 before it is engaged with an engaging portion 16c of the valve plunger 16.

In the present embodiment, the key member 13 is axially movable relative to the valve body 3 between the stepped end face 3a of the valve body 3 and the rear end face of the variable pressure passage 28. In addition, the key member 13 is axially movable relative to the valve plunger 16 within an extent of the annular groove which is formed by the engaging portion 16c. Finally, the key member 13 is axially movable relative to the tubular member 18 as permitted by the axial size of the notch 18a formed in the tubular member 18.

The tubular member 18 has a front portion of a reduced diameter and a rear portion of an increased diameter which is slidably fitted into the inner periphery of the valve body 3. An annular seal member 35 is mounted on the rear portion of an increased diameter to maintain a hermetic seal between the rear portion and the inner periphery of the valve body 3. Toward the rear end, the rear portion of an increased diameter has a reduced thickness and the vacuum valve seat 21 is defined at this position.

The front portion of a reduced diameter of the tubular member 18 is formed with the notch 18a, through which the key member 13 extends. The spring 17 is disposed between the rear portion of an increased diameter of the tubular member 18 and the opposing stepped end face of the valve body 3, thus normally urging the tubular member 18 rearward or toward the valve element 24. The spring 17 has a resilience which is greater than the resilience of the spring 23 which urges the valve element 24.

In the inoperative condition of the negative pressure brake booster 1 shown in FIG. 1, the key member 13 is maintained in its inoperative position by abutment against the wall 2b of the shell 2, and the tubular member 18 is maintained in its inoperative position shown by the abutment of the front end of the notch 18a against the key member 13.

The valve body 3 and the output shaft 11 are also maintained in their inoperative positions shown as a result of the abutment of the stepped end face 3a of the valve body 3 against the key member 13 from the front side. In addition, the front end of the engaging portion 16c abuts against the key member 13, whereby the valve plunger 16 and the input shaft 8 are also maintained in their inoperative positions shown, which represent retracted end positions.

Under the inoperative condition, the vacuum valve seat 21 is removed from the first seat S1 on the valve element 24 to open the vacuum valve 25 while the second seat S2 on the valve element 24 is seated upon the atmosphere valve seat 22 to close the atmosphere valve 26.

As mentioned above, in the present embodiment, the tubular member 18 is slidably fitted into the valve body 3, and the vacuum valve seat 21 is formed on the tubular member 18. Under the inoperative condition shown, the abutment of the key member 13 against the front end of the notch 18 maintains the tubular member 18 and the vacuum valve seat 21 at their rearmost retracted positions. In the inoperative condition shown, an axial clearance L is maintained between the key member 13 and the rear end face of the variable pressure passage 28 which is located rearward thereof.

When the brake pedal is depressed in the inoperative condition shown to drive the input shaft 8 and the valve plunger 16 forward, the vacuum valve 25 is closed while the atmosphere valve 26 is opened, whereby the valve body 3 and the output shaft 11 are driven forward. At the commencement of this operation, the tubular member 18 and the vacuum valve seat 21 which are urged by the spring 17, the valve element 24 which is seated thereon, the valve plunger 16 and the input shaft 8 are temporarily maintained at rest by the key member 13.

At this time, because there is the clearance L in the inoperative condition, the valve plunger 16 and the input shaft 8 are maintained at rest until the clearance L is eliminated or until the rear end face of the variable pressure passage 28 which is located toward the valve body 3 that is driven forward abuts against the key member 13. In this manner, the operating stroke of the input shaft 8 is chosen to be less than the operating stroke of the output shaft 11. Accordingly, if there is an axial play with the piston of a master cylinder, not shown, which is engaged with the output shaft 11, this play can be absorbed.

Since the operating stroke of the input shaft 8 is chosen to be less than the operating stroke of the output shaft 11 in the present embodiment as mentioned above, at the commencement of operation, the clearance between the reaction disc 15 and the end face of the plate plunger 16a (or the front end of the valve plunger 16) is increased instantaneously by an amount corresponding to the clearance L, and subsequently, the reaction disc 15 bulges rearward in response to the brake reaction to abut against the end face of the plate plunger 16a (or the front end of the valve plunger 16).

In order to prevent the jumping value from increasing to an excessively high value if the clearance between the reaction disc 15 and the end face of the plate plunger 16a (or the front end of the valve plunger 16) increases instantaneously immediately after the commencement of operation, in the present embodiment, the front end face of the holder 14 is formed with a tapered surface 14a.

The tapered surface 14a extends from the inner periphery to a radially median position on the front end face so that the end located toward the inner periphery is positioned rearward of the end located toward the outer periphery. As a result of forming the tapered surface 14a, there is created a space 36 between the tapered surface 14a and the opposing rear end face of the reaction disc 15, and continues from the clearance which separates the plate plunger 16a from the rear end face of the reaction disc 15.

The purpose of the holder 14 and the plate plunger 16a is to allow a variety of servo ratios to be established without changing the valve body 3 itself by allowing holders and plate plungers having different proportions of reaction-responsive areas thereof to be used. In FIG. 1, the holder 14 which is provided at this end is utilized to define the space 36 which assists in an elastic deformation of the reaction disc 15 as the reaction increases at a location rearward of the reaction disc 15.

When the holder 14 is formed with the tapered surface 14a to define the space 36, if the clearance between the reaction disc 15 and the end face of the plate plunger 16a (or the end face of the valve plunger 16) increases instantaneously immediately after the commencement of operation, the presence of the space 36 facilitates an elastic deformation of the reaction disc 15 for abutment against the end face of the plate plunger 16a. In this manner, in the present embodiment, it is possible that the operating stroke of the input shaft be reduced in comparison to the operating stroke of the output shaft 11 when the negative pressure brake booster 1 is actuated while simultaneously preventing the jumping value from increasing to an excessively high value.

Operation

With the described arrangement, in the inoperative condition of the negative pressure brake booster 1 shown in FIG. 1, the key member 13 abuts against the rear wall 2b of the shell 2 and comes to a stop, and is abutted by the stepped end face 3a of the valve body 3, whereby the valve body 3 and the output shaft 11 are maintained in their inoperative positions shown. In addition, the key member 13 is abutted by the front end of the notch 18a, whereby the tubular member 18 and the vacuum valve seat 21 are maintained in their retracted positions. In addition, the front end face of the engaging portion 16c abuts against the key member 13, whereby the valve plunger 16 and the input shaft 8 are also maintained in their retracted positions. The clearance L is maintained between the key member 13 and the rear end face of the variable pressure passage 28 which is located rearward of the key member 13.

In this inoperative condition, the vacuum valve seat 21 is removed from the first seat S1 on the valve element 24 to open the vacuum valve 25 while the second seat S2 on the valve element 24 is seated upon the atmosphere valve seat 22 to close the atmosphere valve 26. A clearance is maintained between the reaction disc 15 and the end face of the plate plunger 16a (or the front end face of the valve plunger 16).

When a brake pedal, not shown, is depressed under this inoperative condition, the input shaft 8 and the valve plunger 16 are driven forward. Thereupon the first seat S1 on the valve element 224 becomes seated upon the vacuum valve seat 21 to close the vacuum valve 25 while the atmosphere valve seat 22 is removed from the second seat S2 on the valve element 24 to open the atmosphere valve 26. Accordingly, a pressure difference is developed between the negative pressure in the negative pressure in the constant pressure chamber A and the atmosphere which is introduced into the variable pressure chamber B to drive the valve body 3 and the input shaft 8 forward. The presence of the clearance L immediately after the commencement of operation maintains the valve plunger 16 and the input shaft 8 at rest until the clearance L is eliminated or until the rear end face of the variable pressure passage 28 which is located toward the valve body 3 being driven forward abuts against the key member 13. In this manner, the operating stroke of the input shaft 8 is kept less than the operating stroke of the output shaft 11. Accordingly, if there is any axial play with the piston of a master cylinder, not shown, which is engaged with the output shaft 11, such play can be absorbed.

When the rear end face of the variable pressure passage 28 abuts against the key member 13, the key member 13 will be held sandwiched between the rear end face of the variable pressure passage 28 and the front end of the notch 18a in the tubular member 18, and while maintaining such condition, the key member 13 will move away from the wall 2b to be driven forward together with the valve body 3. The valve plunger 16 and the input shaft 8 are also driven forward together with the key member 13.

When the negative pressure brake booster 1 is actuated in this manner, the brake reaction which acts on the output shaft 11 causes the reaction disc 15 to bulge rearward to abut against the end face of the plate plunger 16a (or the end face of the valve plunger 16). At this time, since the space 36 is secured by the tapered surface 14a formed on the holder 14 in the present embodiment, this facilitates a bulging of a rear axial portion of the reaction disc 15 into the space 36 to abut against the plate plunger 16a.

This point in time is indicated by a jumping point J shown in FIG. 2, and from this time on, the brake reaction is transmitted to a brake pedal through the valve plunger 16 and the input shaft 8.

In this manner, the operating stroke of the input shaft 8 is chosen to be less than the operating stroke of the output shaft 11 in the present embodiment while simultaneously preventing the jumping value from increasing to an excessively high value if the clearance between the reaction disc and the end face of the plate plunger 16a (or the front end of the valve plunger 16) instantaneously increases immediately after the commencement of operation, by providing the space 36 in the manner mentioned above.

When the brake pedal is released from depression after the negative pressure brake booster 1 is actuated, the return spring 12 and the spring 17 allow the various members to return to their inoperative positions shown.

The holder 14 is formed with the tapered surface 14a to create the space 36 in the present embodiment, but the invention is not limited thereto, and a recess may be formed in the rear end face of the reaction disc 15 to provide the space 36. Again, a similar functioning and effect can be achieved as in the described embodiment.

Second Embodiment

Figure 3:
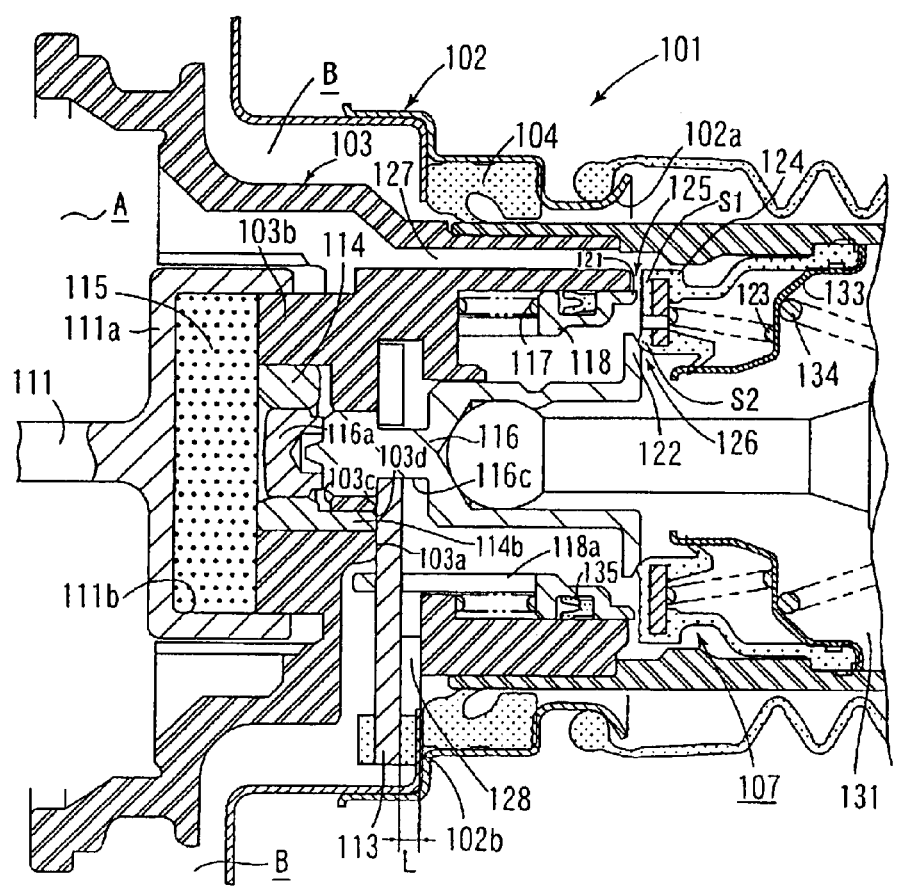
FIG. 3 is a cross-section of a second embodiment of the present invention.

FIG. 3 shows a second embodiment of the present invention. In the first embodiment shown in FIG. 1, the holder 14 is fitted into the annular projection 3b of the valve body 3 and cannot move. However, in the second embodiment, a holder 114 is slidably fitted into an annular projection 103b so that when a valve mechanism 107 is operated, a space is created adjacent to and rearward of a reaction disc 115.

Specifically, in the second embodiment, the holder 114 has an axial size which is less than the axial size of the annular projection 103b, and is slidably fitted into the annular projection 103b. This allows the holder 114 to move between a forwardly facing stepped end face 103c of a valve body 103 and the rear end face of the reaction disc 115. The holder 114 is formed with an engaging portion 114b which extends axially rearward.

On the other hand, the valve body 103 is formed with a through-opening 103d which extends from a front stepped end face 103c to a rear stepped end face 103a, and the engaging portion 114b of the holder 114 slidably extends through the through-opening 103b so that its distal end abuts against a key member 113.

An axial size of the holder 114 inclusive of the engaging portion 114b is chosen to be equal to the axial size from the rear stepped end face 103a to the end face of the front annular projection 103b. Consequently, in the inoperative condition shown, when the distal end of the engaging portion 114b abuts against the key member 113, the front end face of the holder 114 lies on a common plane as the front end face of the annular projection 103b to abut against the reaction disc 115. At this time, a clearance is maintained between the rear end face of the holder 114 and the opposing stepped end face 103c.

In the second embodiment, the front end face of the holder 114 is not formed with a tapered surface which is provided in the first embodiment, but is only gently chamfered around the inner periphery. In other respects, the arrangement is similar to the first embodiment shown in FIG. 1. Accordingly, corresponding parts to those shown in the first embodiment are designated by like reference numerals as used before, to which 100 is added.

With the second embodiment, when the rear end of a variable pressure passage 128 abuts against the key member 113 from the rear side to move it away from the wall 102b of a shell 102 immediately after the commencement of operation of the negative pressure brake booster 101, the key member 113 becomes freely movable within the engaging portion 116c of a valve plunger 116. The holder 114 is also freely movable between the reaction disc 115 and the stepped end face 103c. Accordingly, a space is created adjacent to and rearward of the reaction disc 115 having a breadth which corresponds to the clearance which has been maintained between the rear end face of the holder 114 and the stepped end face 103c in the inoperative condition shown, which enables a free elastic deformation of the reaction disc 115. This allows an elastic deformation of the reaction disc 115 in response to the reaction which acts on the output shaft 111.

Accordingly, the second embodiment is capable of achieving a similar functioning and effect as achieved by the first embodiment.

While the invention has been described above in connection with several embodiments thereof, it should be understood that a number of changes, modifications and substitutions therein are possible from the above disclosure without departing from the spirit and the scope of the invention defined by the appended claims.

What is claimed is:

1. A negative pressure brake booster comprising a valve body slidably disposed within a shell, a power piston mounted on the valve body, a constant pressure chamber and a variable pressure chamber defined across the power piston within the shell, a valve mechanism operated by an input shaft for switching a communication between the constant pressure chamber, the variable pressure chamber and the atmosphere, the valve mechanism including a vacuum valve seat formed inside the valve body, a valve plunger slidably fitted into the valve body and connected to the input shaft, an atmosphere valve seat formed on the valve plunger and a valve element adapted to be engaged with or disengaged from the vacuum valve seat and the atmosphere valve seat, a reaction disc disposed between an output shaft and a forwardly facing end face of the valve body for transmitting a brake reaction which acts on the output shaft as the valve mechanism is operated by the input shaft through the valve plunger, a tubular member slidably fitted into the inner periphery of the valve body and having the vacuum valve seat formed thereon, urging means for normally urging the tubular member rearward and holding means for holding the tubular member, the valve plunger and the input shaft in their inoperative state at the commencement of operation of the valve mechanism until the valve body and the output shaft have been driven forward through a given stroke such that an operation stroke of the input shaft is smaller than an operation stroke of the output shaft, thereby creating a space between an end face of a rear portion of the reaction disc and the valve body which assists in allowing an elastic deformation of the reaction disc toward the valve plunger at the commencement of operation of the valve mechanism.

2. A negative pressure brake booster according to claim 1 in which a forwardly facing end face of the valve body is formed with a tapered surface having an end located toward its inner periphery which is located rearward of an end of the tapered surface located toward its outer periphery, the space being created inside the tapered surface.

3. A negative pressure brake booster according to claim 1 in which an annular projection is formed on a front portion of the valve body, and further comprising a holder disposed within the annular projection and forming part of the valve body for permitting a servo ratio to be changed, the outer periphery of a front portion of the valve plunger being slidably fitted into the holder, the forwardly facing end face being defined by the end face of the annular projection and the front end face of the holder, the front end face of the holder being formed with a tapered surface toward the inner periphery to create the space at a location adjacent to the tapered surface.

4. A negative pressure brake booster according to claim 1 in which an annular projection is formed on a front portion of the valve body, the forwardly facing end face being defined by an end face of the annular projection, an annular holder being slidably fitted into the annular projection so as to be axially movable between the reaction disc and a stepped end face of the valve body, the holder slidably extending through the outer periphery of a front portion of the valve plunger, the arrangement being such that at the commencement of operation of the valve mechanism, the holder moves rearward within the annular projection to create the space at a location rearward of the reaction disc.

5. A negative pressure brake booster according to claim 1 in which the holding means also serves as restricting means which restricts the inoperative position of the holder.

6. A negative pressure brake booster according to claim 1, further comprising a key member extending through a radial variable pressure passage formed in the valve body and a notch formed in the tubular member to be engaged with the valve plunger, wherein the key member, an engaging portion of the valve plunger, the notch in the tubular member and the urging means constitute together the holding means.

7. A negative pressure brake booster according to claim 6 in which a rear end face of the variable pressure passage forms release means which releases the members from retention by the holding means.

8. A negative pressure brake booster comprising a valve body slidably disposed within a shell, a power piston mounted on the valve body, a constant pressure chamber and a variable pressure chamber defined across the power piston within the shell, a valve mechanism operated by an input shaft for switching a communication between the constant pressure chamber, the variable pressure chamber and the atmosphere, the valve mechanism including a vacuum valve seat formed inside the valve body, a valve plunger slidably fitted into the valve body and connected to the input shaft, an atmosphere valve seat formed on the valve plunger and a valve element adapted to be engaged with or disengaged from the vacuum valve seat and the atmosphere valve seat, a reaction disc disposed between an output shaft and a forwardly facing end face of the valve body for transmitting a brake reaction which acts on the output shaft as the valve mechanism is operated by the input shaft through the valve plunger, a tubular member slidably fitted into the inner periphery of the valve body and having the vacuum valve seat formed thereon, urging means for normally urging the tubular member rearward and holding means for holding the tubular member at its inoperative position at the commencement of operation of the valve mechanism until the valve body and the output shaft have been driven forward through a given stroke, thereby creating a space between a rear portion of the reaction disc and the valve body which assists in allowing an elastic deformation of the reaction disc toward the valve plunger, wherein a forwardly facing end face of the valve body is formed with a tapered surface having an end located toward the inner periphery which is located rearward of an end of the tapered surface located toward the outer periphery, the space being created inside the tapered surface.

9. A negative pressure brake booster comprising a valve body slidably disposed within a shell, a power piston mounted on the valve body, a constant pressure chamber and a variable pressure chamber defined across the power piston within the shell, a valve mechanism operated by an input shaft for switching a communication between the constant pressure chamber, the variable pressure chamber and the atmosphere, the valve mechanism including a vacuum valve seat formed inside the valve body, a valve plunger slidably fitted into the valve body and connected to the input shaft, an atmosphere valve seat formed on the valve plunger and a valve element adapted to be engaged with or disengaged from the vacuum valve seat and the atmosphere valve seat, a reaction disc disposed between an output shaft and a forwardly facing end face of the valve body for transmitting a brake reaction which acts on the output shaft as the valve mechanism is operated by the input shaft through the valve plunger, a tubular member slidably fitted into the inner periphery of the valve body and having the vacuum valve seat formed thereon, urging means for normally urging the tubular member rearward and holding means for holding the tubular member at its inoperative position at the commencement of operation of the valve mechanism until the valve body and the output shaft have been driven forward through a given stroke, thereby creating a space between a rear portion of the reaction disc and the valve body which assists in allowing an elastic deformation of the reaction disc toward the valve plunger, wherein an annular projection is formed on a front portion of the valve body and a holder is disposed within the annular projection and forms part of the valve body for permitting a servo ratio to be changed, an outer periphery of a front portion of the valve plunger is slidably fitted into the holder, a forwardly facing end face is defined by an end face of the annular projection and a front end face of the holder, the front end face of the holder being formed with a tapered surface toward its inner periphery to create the space at a location adjacent to the tapered surface.

* * * * *